J. ROSENBAUM.
DEMOUNTABLE RIM FOR VEHICLE WHEELS.
APPLICATION FILED JULY 10, 1912.
1,059,765.
Patented Apr. 22, 1913.
2 SHEETS—SHEET 1.
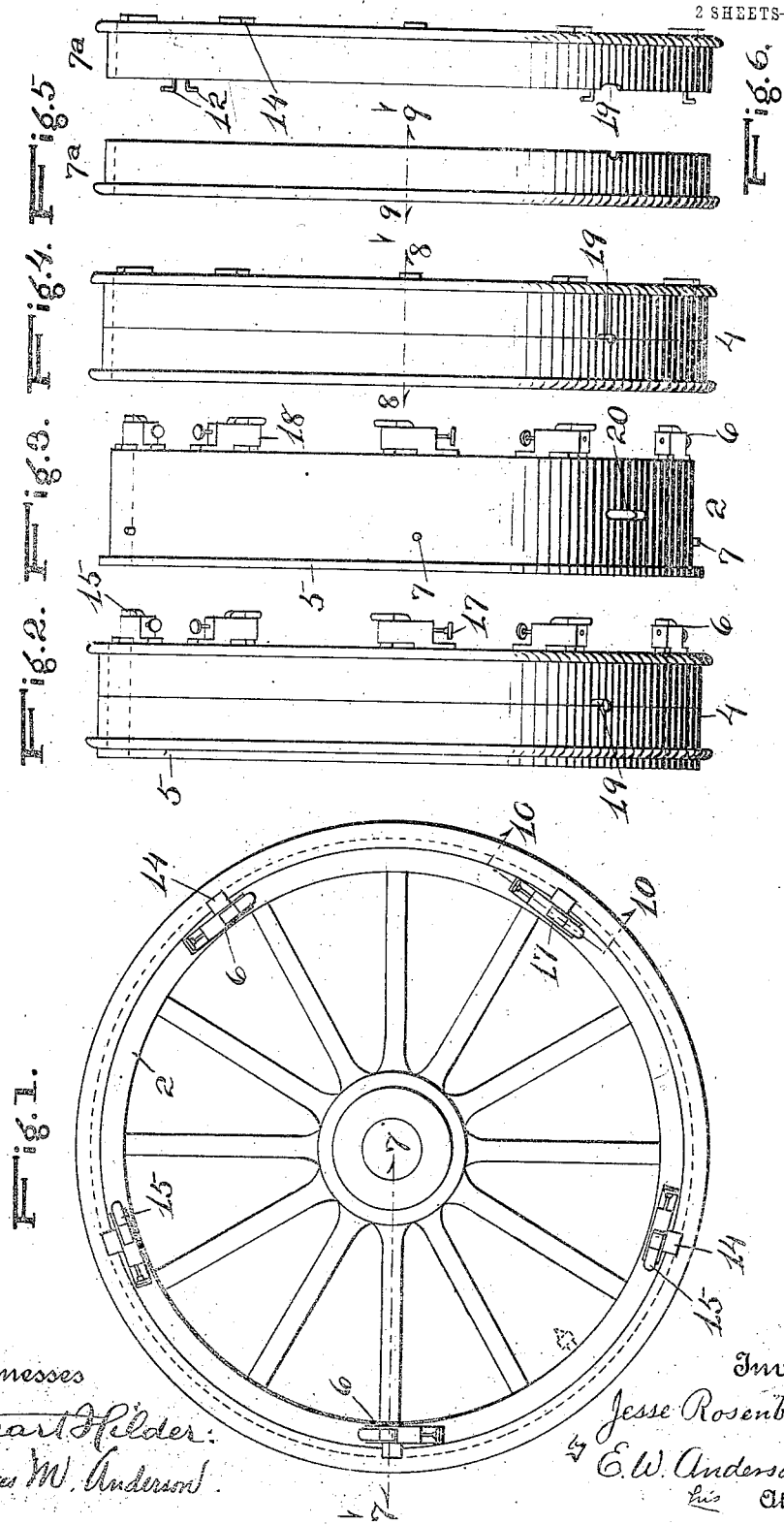

J. ROSENBAUM.
DEMOUNTABLE RIM FOR VEHICLE WHEELS.
APPLICATION FILED JULY 10, 1912.
1,059,765.
Patented Apr. 22, 1913.
2 SHEETS—SHEET 2.
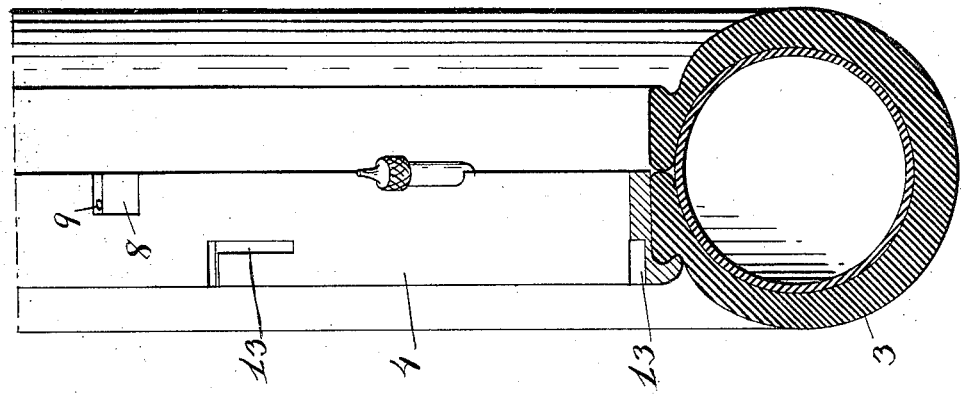
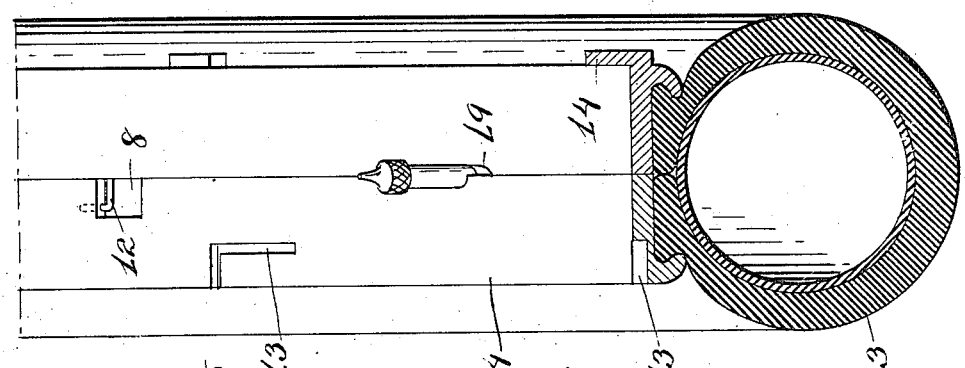
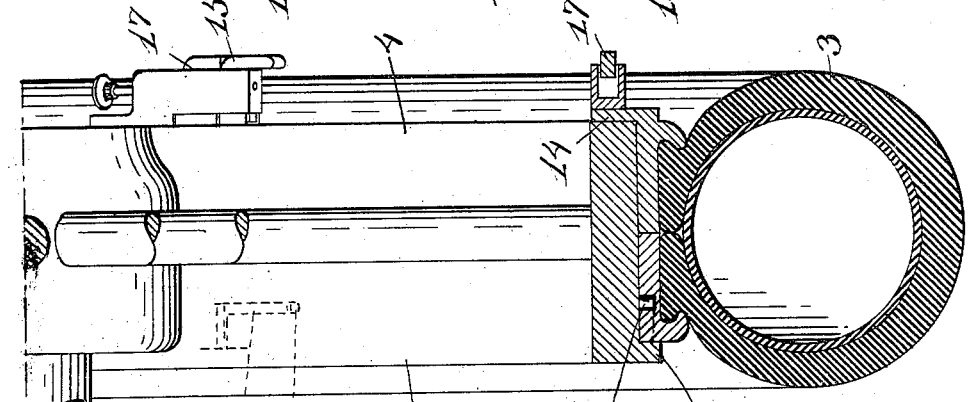
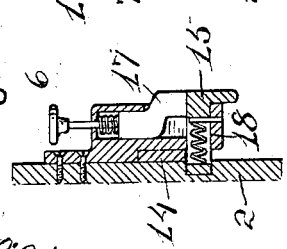
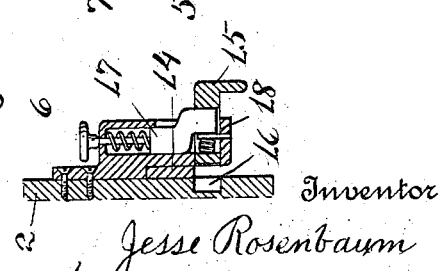
Witnesses
Stuart Hilder.
Frances M. Anderson.
Inventor
Jesse Rosenbaum
by E. W. Anderson & Son.
his Attorneys

UNITED STATES PATENT OFFICE.

JESSE ROSENBAUM, OF MOUNT VERNON, INDIANA.

DEMOUNTABLE RIM FOR VEHICLE-WHEELS.

1,059,765.   Specification of Letters Patent.   Patented Apr. 22, 1913.

Application filed July 10, 1912.   Serial No. 708,714.

*To all whom it may concern:*

Be it known that I, JESSE ROSENBAUM, a citizen of the United States, resident of Mount Vernon, in the county of Posey and State of Indiana, have made a certain new and useful Invention in Demountable Rims for Vehicle-Wheels; and I declare the following to be a full, clear, and exact description of the same, such as will enable others skilled in the art to which it appertains, to make and use the invention, reference being had to the accompanying drawings, and to letters or figures of reference marked thereon, which form a part of this specification.

Figure 1 is a side view of the invention as applied. Fig. 2 is a plan view of the same. Fig. 3 is a similar view of the permanent rim. Fig. 4 is a similar view of the demountable rim. Figs. 5 and 6 are similar views of the sections of the demountable rim separated from each other. Fig. 7 is a section on the line 7—7, Fig. 1. Fig. 8 is a section on the line 8—8, Fig. 4. Fig. 9 is a section on the line 9—9, Fig. 5. Figs. 10 and 11 are detail sectional views of one of the fastening devices engaged and disengaged respectively with the recess of the permanent rim and with the lug of the demountable rim section.

The object of the invention is mainly to provide for wheels of vehicles having elastic tires supplementary separable tire-holding demountable rims, which can be quickly operated; and the invention consists in the novel construction and combinations of parts, as hereinafter set forth.

In the accompanying drawings, illustrating the invention, the numeral 2 indicates the permanent rim of the wheel of a motor operated vehicle; 3 a pneumatic tire and 4 a separable and demountable tire-holding rim which is designed to surround the permanent rim. This is provided with a circumferential flange 5 of about a half-inch in depth, extending outward around its inside edge, this flange serving as a lateral abutment to aid in securing the demountable rim in place. The outer edge of the permanent rim is provided with several fastening devices 6 and with a number of pins or catches 7, whereby the removable rim 4 is secured to the permanent rim of the wheel.

The removable or demountable rim 4 consists of two circular halves or sections 7ª, each of which constitutes a lateral portion of the rim. These sections are designed to be joined together on a central or intermediate plane of the rim, to hold the tire, and are separable from each other. Each section is provided with a suitable outer flange, to provide for the attachment of the tire. The inner or meeting edges of the sections are flush with each other, one of these sections, usually the inner one, being provided with a plurality of recesses 8 having offset holes or bearings 9, the other section having a similar number, usually five, of angular catches 12 adapted to enter the recesses 8 and to engage the holes or bearings 9 when one of the sections is moved circularly in relation to the other. In this way it is designed to provide means for easily connecting the sections together in a secure manner to form a complete rim, and for their quick separation, one from the other. The inner section is also provided on its inside surface with several angular grooves 13, to engage the studs or catches 7 of the permanent rim, each groove having its outer portion opening on the outer edge of the section, and its inner portion at right angles to said outer portion and extending in the direction of the circular elements of the section and in the opposite direction to that of the catches 12 of the opposite section.

The outer section of the demountable rim is provided with lugs 14 projecting inward from its outer edge and designed to engage the fastening devices 6 of the permanent rim. The means for fastening these lugs consist of spring catches, pins or bolts 15, arranged in suitable bearings 18 in the edge or outer marginal portion of the permanent rim and designed to enter and engage recess bearings 16 in the edge of this permanent rim, said catches, pins or bolts being held out of engagement when required by suitable spring catch devices 17, provided in connection with the bearings 18 aforesaid.

A marginal notch or passage 19 is made in the meeting edge of one or both of the sections of the demountable rim, for the reception of the valve stem of the inner tube of the tire. The valve stem passage is located in position to communicate with a slot 20 through the permanent rim, and said slot is made long enough to allow for the circular movement of the demountable rim required in effecting its attachment to the permanent rim.

In order to put on a tire, the inner section of the removable rim may be laid flat and the tire pushed or fitted on it, with the valve stem in the marginal notch. Then push or fit on the outer section so that its edge will engage the meeting edge of the inner section, its marginal notch will take in the valve stem, and its angular catches will enter the recesses 8 of the other section. This outer half or section of the rim being turned to the left, the angular catches will enter the recesses 8 of the other section, and the two halves of the demountable rim will be fastened together, forming a complete rim with a smooth interior adapted to fit the outer or bearing surface of the permanent rim. In putting this rim, with the engaged tire, on the wheel, the valve stem is introduced into the slot provided for it in the permanent rim, and the demountable rim is pushed on the permanent rim so that its inner edge will engage the flange 5 and its angular grooves will receive the catches 7 of the latter. This slot is made long enough to allow for the circular movement of the demountable rim, which is turned until these catches are locked in the angular grooves. At the same time the fastening devices 6 of the permanent rim, being held out of engagement by the spring catches 17, will allow the lugs 14 of the demountable rim to enter the bearings of the latter, which will be automatically closed upon the withdrawal of the spring catches. By such means the demountable rim is adjusted to entirely surround the cylindrical bearing face of the permanent rim, and is securely attached thereto.

Reversal of operation of the means described will enable the operator to slide the demountable rim off the wheel and take it apart for the removal of the tire, when necessary for replacement or for purposes of repair.

Having described the invention, what I claim and desire to secure by Letters Patent is:

1. In a vehicle wheel, a permanent rim having radial outwardly extending projections and at one side a stop shoulder and at the other side releasable stop devices, and a demountable tire-holding rim having contact at one side thereof with said stop shoulder and at its other side radial inwardly extending projections engaging said releasable stop devices, said demountable rim having laterally slidable engagement with the permanent rim and inner bayonet slots engaging said outwardly extending projections.

2. In a vehicle wheel, a permanent rim having radial outwardly extending projections, and at one side a stop shoulder and at the other side spring-acting releasable stop devices, and a demountable tire-holding rim having contact at one side thereof with said stop shoulder and at its other side radial inwardly extending projections engaging said releasable stop devices, said demountable rim having laterally slidable engagement with the permanent rim and inner bayonet slots engaging said outwardly extending projections, said permanent rim having releasable spring-acting means to retain said stop devices in released position.

In testimony whereof I affix my signature, in presence of two witnesses.

JESSE ROSENBAUM.

Witnesses:
J. H. BLACKBURN,
JACOB ROSENBAUM.